United States Patent
Chen et al.

(10) Patent No.: US 9,057,647 B2
(45) Date of Patent: Jun. 16, 2015

(54) DETACHED-TYPE TEMPERATURE INDICATOR AND METHOD FOR USING THE SAME

(71) Applicant: Industrial Technology Research Institute, Hsinchu (TW)

(72) Inventors: Jian-Ren Chen, Hsinchu (TW); Leii H. Chang, Hsinchu County (TW); Chen-Ying Kao, Taoyuan County (TW); Ju-Chia Kuo, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 142 days.

(21) Appl. No.: 14/020,881

(22) Filed: Sep. 8, 2013

(65) Prior Publication Data

US 2014/0334520 A1    Nov. 13, 2014

(30) Foreign Application Priority Data

May 13, 2013    (TW) .............................. 102116927 A

(51) Int. Cl.
*G01K 1/02*    (2006.01)
*G01K 7/00*    (2006.01)

(52) U.S. Cl.
CPC *G01K 1/028* (2013.01); *G01K 7/00* (2013.01); *G01K 1/02* (2013.01); *G01K 2207/00* (2013.01)

(58) Field of Classification Search
None
See application file for complete search history.

(56) References Cited

U.S. PATENT DOCUMENTS

| 4,432,656 | A | 2/1984 | Allmendinger |
| 5,709,476 | A * | 1/1998 | Wu et al. ....................... 374/208 |
| 6,042,264 | A | 3/2000 | Prusik et al. |
| 6,916,116 | B2 | 7/2005 | Diekmann et al. |
| 7,604,398 | B1 * | 10/2009 | Akers et al. ................... 374/102 |
| 7,691,634 | B2 | 4/2010 | Vaillant |
| 8,187,892 | B2 | 5/2012 | Ribi |
| 2009/0050049 | A1 | 2/2009 | Craig et al. |
| 2012/0114013 | A1 | 5/2012 | Tsuchida |

FOREIGN PATENT DOCUMENTS

| CN | 101718597 | 6/2010 |
| CN | 201870632 | 6/2011 |
| TW | M385765 | 8/2010 |
| TW | I363939 | 5/2012 |

OTHER PUBLICATIONS

"Office Action of Taiwan Counterpart Application", issued on Nov. 13, 2014, p. 1-p. 3.

(Continued)

*Primary Examiner* — Andre Allen
(74) *Attorney, Agent, or Firm* — Jianq Chyun IP Office

(57) ABSTRACT

A detached-type temperature indicator and method for using the same is disclosed. The indicator includes a temperature sensing module and a temperature display module. These two modules are separated apart with a distance, and the temperature change sensed by the temperature sensing module can be displayed on the separate temperature display module without using any power sources. This indicator is suitable for observing the magnetic sensing patterns which reflect the temperature variations within the package from the exterior of the package without opening the package. Also, this indicator may be used repeatedly.

16 Claims, 5 Drawing Sheets

(56) References Cited

OTHER PUBLICATIONS

Kinnard and Fausi, "A Self-Compensating Temperature Indicator," American Institute of Electrical Engineers, Transactions of the AIEE, Jul. 1930, pp. 949-951.

Galagan and Su, "Fadable ink for time—temperature control of food freshness: Novel new time—temperature indicator," Food Research International, Jul. 2008, pp. 653-657, vol. 41.

Kinnard and Faus, "Temperature Errors in Induction Watthour Meters," American Institute of Electrical Engineers, Transactions of the AIEE, Feb. 1925, pp. 275-287.

Wang et al, "Thermo-sensitive Materials for the Time-Temperature Indicator," Advanced Materials Research, Jul. 2011, pp. 2442-2445, vol. 284-286.

Bergmair et al, "Wireless and passive temperature indicator utilizing the large hysteresis of magnetic shape memory alloys," Applied Physics Letters, Jul. 26, 2012, vol. 101.

* cited by examiner

DETACHED-TYPE TEMPERATURE INDICATOR AND METHOD FOR USING THE SAME

CROSS-REFERENCE TO RELATED APPLICATION

This application claims the priority benefit of Taiwan application serial no. 102116927, filed on May 13, 2013. The entirety of the above-mentioned patent application is hereby incorporated by reference herein and made a part of this specification.

BACKGROUND OF THE DISCLOSURE

1. Technical Field

The disclosure relates to a detached-type temperature indicator capable of displaying the sensed temperature change on the separate temperature display module without using any power sources.

2. Background

Temperature monitoring may be necessary for many goods in transit or storage, especially refrigerated or perishable goods. It is a very important issue to ensure the temperature of the goods kept within the predetermined temperature range. This is because the temperature beyond the predetermined range will deteriorate the goods wholly or to a certain degree. Therefore, in the warehousing & storage industry and logistics industry, temperature sensing displays are commonly used to show the temperature of the perishable goods and at the temperature beyond the predetermined range, provide alerts for clients to act in accordance with appropriate treatments.

At present, most of the temperature indicators incorporate the sensing unit and the display into one. In order to obtain more accurate temperature of the item, the indicator is often placed in the environment close to the item, i.e. in the cold box or in the packing container. However, it is inconvenient to read the indicator placed in the box and frequent unpacking of the box may disturb the temperature of the item within the box. However, if the temperature indicator is placed on clearly visible positions, it is unable to correctly reflect the actual ambient temperature of the goods.

Therefore, it is desirable to develop a temperature indicator, which is easy to read visually or to interpret but also reflect the actual temperature of the conserved environment of the item.

SUMMARY

This disclosure provides a detached-type temperature indicator, suitable for visual interpretation and capable of reflecting the actual temperature of the conserved environment of the item, without using electricity. Such temperature indicator is easy to use and inexpensive, suitable for applications in warehousing & storage industry, logistics industry or retail industry.

The embodiment of the disclosure provides a detached-type temperature indicator comprising a temperature sensing module and a temperature display module. The temperature sensing module includes a tubular body having at least one chamber and a plurality of magnet balls, and the at least one chamber of the tubular body is filled with a eutectic material for low temperature energy storage. The plurality of magnet balls include a first magnet ball secured at the bottom of the tubular body and a second magnet ball in the at least one chamber, and the second magnet ball is immersed in the eutectic material for low temperature energy storage filled in the at least one chamber. The temperature sensing module is attached to an inner side of the wall via the temperature sensing module adhesive layer. The temperature display module includes a transparent plate internally separated into a plurality of cells and magnetic sensing substances uniformly dispersed within the plurality of cells, and the magnetic sensing substances have magnetic attraction with the first magnet ball and the second magnet ball to respectively show a first magnetic sensing pattern and a second magnetic sensing pattern. The temperature display module is attached to an outer side of the wall via the temperature display module adhesive layer. The temperature sensing module and the temperature display module are attached to the inner side and the outer side of the wall respectively, and positions of the temperature sensing module and the temperature display module on the inner side and the outer side of the wall aligned with each other, so that a temperature change sensed by the temperature sensing module is displayed in the temperature display module through a pattern change of the first and second magnetic sensing patterns via magnetic attraction of the plurality of magnet balls.

The embodiment of the disclosure provides a detached-type temperature indicator comprising a temperature sensing module and a temperature display module. The temperature sensing module includes a tubular body having at least one chamber and at least one magnet ball, and the at least one chamber of the tubular body is filled with a eutectic material for low temperature energy storage. The at least one magnet ball is immersed in the eutectic material for low temperature energy storage filled in the at least one chamber. The temperature sensing module is attached to an inner side of the wall via the temperature sensing module adhesive layer. The temperature display module includes a transparent plate separated into at least two regions and magnetic sensing substances uniformly dispersed within the cells of the at least two regions, and the magnetic sensing substances have magnetic attraction with the at least one magnet ball to show a magnetic sensing pattern. The temperature display module is attached to an outer side of the wall via the temperature display module adhesive layer. The temperature sensing module and the temperature display module are attached to the inner side and the outer side of the wall respectively, and positions of the temperature sensing module and the temperature display module on the inner side and the outer side of the wall aligned with each other, so that a temperature change sensed by the temperature sensing module is displayed in the temperature display module through the magnetic sensing pattern via magnetic attraction of the at least one magnet ball.

The embodiment of the disclosure provides a method of using a detached-type temperature indicator. The method includes freezing the temperature sensing module of the temperature indicator upside down. The temperature sensing module includes a tubular body having at least one chamber and a plurality of magnet balls, and the at least one chamber of the tubular body is filled with a eutectic material for low temperature energy storage. The plurality of magnet balls includes a first magnet ball secured at the bottom of the tubular body and a second magnet ball contained in the at least one chamber, and the second magnet ball is frozen and fixed in the eutectic material for low temperature energy storage. The temperature sensing module is inverted after completing freezing the temperature sensing module. The temperature sensing module is attached to an inner side of a wall of a box, and the temperature display module is attached to an outer side of the wall. The temperature display module includes magnetic sensing substances, and the magnetic sensing substances have magnetic attraction with the first magnet ball and the second magnet ball to respectively show a first magnetic sensing pattern and a second magnetic sensing pattern. During sensing the temperature of an item within the box is performed, the second magnet ball remains stationary when the temperature of the item is lower than or equal to a freezing temperature of the eutectic material for low temperature energy storage, while the second magnet ball shifts when the temperature of the item is higher than the freezing temperature. The first magnetic sensing pattern and the second magnetic sensing pattern of the temperature display module are read directly from outside of the wall. A temperature change sensed by the temperature sensing module is displayed in the temperature display module through a pattern change of the first and second magnetic sensing patterns.

The embodiment of the disclosure provides a method of using a detached-type temperature indicator. The method includes freezing the temperature sensing module of the temperature indicator upside down. The temperature sensing module includes a tubular body having at least one chamber and at least one magnet ball, and the at least one chamber of the tubular body is filled with a eutectic material for low temperature energy storage. The at least one magnet ball is frozen and fixed in the eutectic material for low temperature energy storage. The temperature sensing module is inverted after completing freezing the temperature sensing module. The temperature sensing module is attached to an inner side of a wall of a box, and the temperature display module is attached to an outer side of the wall. The temperature display module includes magnetic sensing substances, and the magnetic sensing substances have magnetic attraction with the at least one magnet ball to show a magnetic sensing pattern. During sensing the temperature of an item within the box is performed, the at least one magnet ball remains stationary when the temperature of the item is lower than or equal to a freezing temperature of the eutectic material for low temperature energy storage, while the at least one magnet ball shifts when the temperature of the item is higher than the freezing temperature. The magnetic sensing pattern of the temperature display module is read directly from outside of the wall. A temperature change sensed by the temperature sensing module is displayed in the temperature display module through a pattern change of the magnetic sensing pattern.

A detailed description is given in the following embodiments with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

This disclosure provides a detached-type temperature indicator, which may be divided into a temperature sensing module and a temperature display module. These two modules can be separated with a certain distance, and the temperature sensed by the temperature sensing module can be displayed in the separate temperature display module without using electricity.

Figure 1:
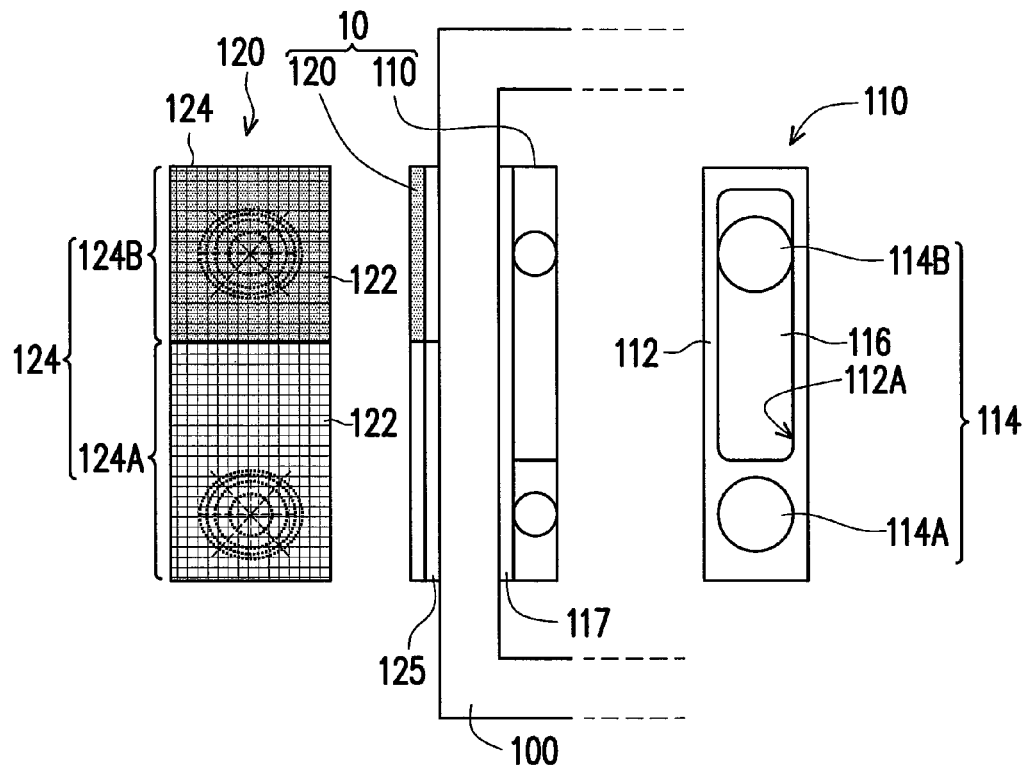
FIG. 1 is a schematic view of a detached-type temperature indicator structure according to the first embodiment of the disclosure.

FIG. 1 is a schematic display of a detached-type temperature indicator structure according to the first embodiment of the disclosure. As shown in FIG. 1, the detached-type temperature indicator 10 includes at least a temperature sensing module 110, an adhesive layer 117 of the temperature sensing module 110, a temperature display module 120 and an adhesive layer 125 of the temperature display module 120. The adhesive layer 117 of the temperature sensing module 110 (temperature sensing module adhesive layer) is used to attach the temperature sensing module 110 onto the inner side of a wall 100 of a box. The box can be, for example, cold box, insulated cold storage box, bag, carton, crate, insulated plastic container, etc. The adhesive layer 125 (temperature display module adhesive layer) is used to attach the temperature display module 120 onto the outer side of the box wall 100. In the right part of FIG. 1, an enlarged structure of the temperature sensing module 110 is shown. The temperature sensing module 110 includes a tubular body 112 having a chamber 112A and a plurality of magnet balls 114 therein. The chamber 112A of the tubular body 112 is filled with a eutectic material for low temperature energy storage 116. The magnet balls 114 include a magnet ball 114A (as the first magnet ball) secured at the bottom of the tubular body 112 and a magnet ball 114B (as the second magnet ball) located in the chamber 112A. The magnet ball 114B is immersed in the eutectic material for low temperature energy storage 116 filled in the chamber 112A. The eutectic material for low temperature energy storage 116 is prepared by using inorganic salts, or organic salts, or hydrates or mixed solutions of hydrocarbon oxides and fluorides, under the equilibrium of the solid-liquid phase, with the properties of low eutectic points. Such eutectic material has the characteristics of a constant melting temperature, ensuring a constant temperature at low temperatures. The eutectic material for low temperature energy storage can freeze into a solid below a certain temperature or a temperature range and dissolve into a liquid above the certain temperature or the temperature range. The material of the tubular body is a non-magnetic material, such as glass or polymer.

In this embodiment, the temperature sensing module 110 and the temperature display module 120 may be attached to the inner and outer sides of the box wall 100 of the packaging of items, while the attachment positions of both modules should correspondingly align to each other. The temperature sensing module 110 is attached to the inner side of the box wall 100 through the adhesive layer 117. The packaging of the item is made of the packaging materials insulating the inner cold environment from the outside air and higher temperatures. The package material generally is, for example, a polymer material, cloth or a foamed plastic material. In this embodiment, the material of the box wall 100 is a non-magnetic material. Depending on the product requirements, the whole module of the temperature sensing module 110 may be covered with a protective layer (not shown), and the protective layer may be of a non-magnetic metal material to accelerate the heat conduction process. In order to prevent inadvertent operation of placing the item upside-down, the protective layer may be labeled with markers for the up or down direction, so as to alert the worker.

In the left part of FIG. 1, the enlarged structure of the temperature display module 120 is shown. In FIG. 1, the temperature display module 120 may include a transparent plate 124 internally divided into a plurality of cells 122, with iron powder uniformly dispersed within the cells 122. Those divided cells 122 prevent the iron powder from accumulation together. Alternatively, the temperature display module 120 may also use iron particles or magnet balls with different poles in different colors. The temperature display module 120 is attached to the outer side of the box wall 100 through the adhesive layer 125. As the temperature sensing module 110 and the temperature display module 120 respectively attached to the inner and outer sides of the box wall 100, through magnetic attraction, the magnet balls of the temperature sensing module 110 will attract the iron powder at a specific location of the cells 122 of the temperature display module 120 to show a magnetic sensing pattern (a circular iron powder pattern corresponding to the circular magnet ball is shown in this embodiment), thus conveying the sensing result of the temperature sensing module 110 to the temperature display module 120. Magnetic attraction between the two modules should be adjusted according to the thickness of the box wall 100. In general, the magnetic strength of the magnetic force between the two modules is designed to be strong enough to cross the general non-magnetic packaging materials, such as corrugated cardboard or foamed plastic material, and to attract the iron powder or magnet balls over the thickness of the box wall 100.

To enhance visual distinction effects, the transparent plate 124 can be divided into two regions (shown herein as the upper and lower regions 124B, 124A), painted in different colors. As shown on the left of FIG. 1, owing to the iron powder gathered together, magnetic sensing patterns are shown in the two regions 124A, 124B, each corresponding to the position of each of the magnet balls 114A, and 114B.

In order to enhance the accuracy and efficiency of the attachment, the inner and outer sides of the box wall are marked with attachment positions to facilitate the alignment of both modules, so that the temperature sensing module 110 and the temperature display module 120 can be attached to the attachment positions of the inner and outer sides of the box wall 100 and both modules can sense each other magnetically.

This disclosure provides a method of using a detached-type temperature indicator, the method comprising the steps of:

(1) The attachment locations of the temperature sensing module and the temperature display module are respectively labeled on the inner and outer sides of the wall of the box, for alignment of the attachment positions of both modules.

(2) At least one detachable temperature sensing module is frozen upside down.

(3) The temperature sensing module is flipped up following the completion of the freezing, and the temperature sensing module is attached to the labeled attachment position on the inner side of the box wall.

(4) The temperature display module is attached to the labeled attachment position on the outer side of the box wall corresponding to the temperature sensing module.

(5) At any time after the goods shipped out, the location of the magnetic sensing pattern (such as, a circle) present in the transparent plate of the temperature display module is observed to determine or interpret the temperature changes.

Measurement of Single Temperature Range

Figure 2:
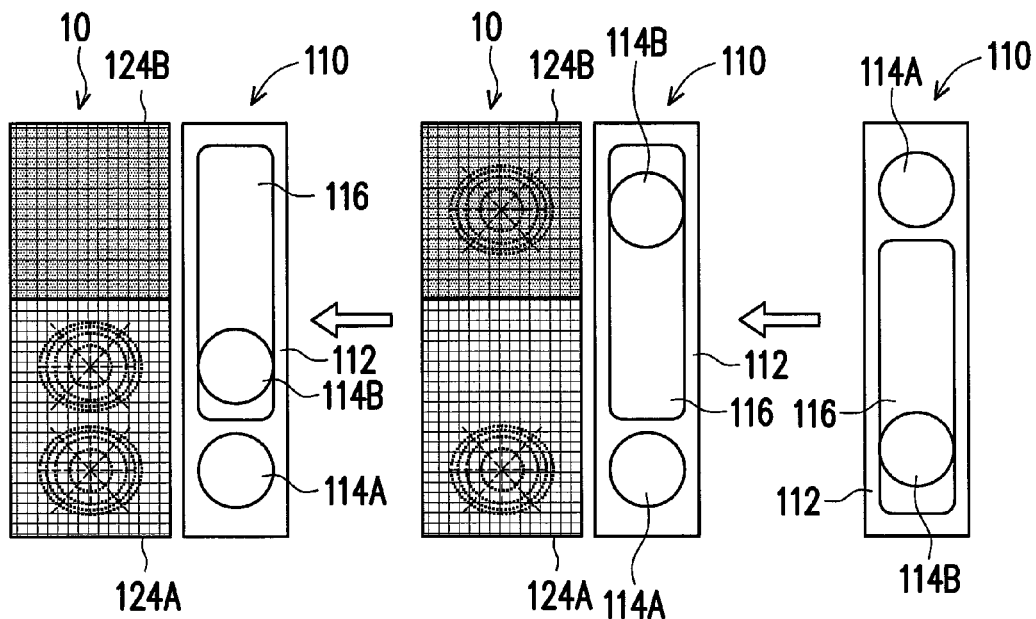
FIG. 2 shows the reading process and the interpretation methods of the detached-type temperature indicator structure according to the first embodiment of the disclosure.

FIG. 2 shows the reading process and the interpretation methods of the detached-type temperature indicator structure according to the first embodiment of the disclosure. As shown on the right of FIG. 2, for the detached-type temperature indicator 10, before application, the temperature sensing module 110 is placed upside-down to ensure the magnet ball 114B away from the magnet ball 114A. If the magnet ball 114B was in the environment warmer than the freezing temperature of the eutectic material for low temperature energy storage 116 and the magnet ball 114B was shifted or slipped into the bottom of the chamber in the tubular body 112, and then the temperature was lower than the freezing temperature leaving the eutectic material for low temperature energy storage 116 solidified, the magnet ball 114B was trapped in the position close to the magnet ball 114A. In this case, the eutectic material for low temperature energy storage 116 has to be liquidized and the magnet ball 114B is moved away from the magnet ball 114A. After re-freezing, the magnet ball 114B is frozen away from the magnet ball 114A secured at the other end of the tube, to ensure that subsequent correct interpretation of the temperature change. The temperature sensing module 110 can be individually frozen. However, if the temperature sensing module 110 has been previously attached to the inner side of the box wall, it is not necessary to pull the sensing module out to freeze as long as the entire box is frozen upside down. Nevertheless, the scope of this disclosure is not limited to the embodiments described herein. The temperature display module 120 can also be pre-attached to the outer side of the box to align with the temperature sensing module 110.

As shown in the middle part of FIG. 2, during application, because the eutectic material for low temperature energy storage 116 in the tubular body of the temperature sensing module 110 has been frozen into a solid, the magnet balls 114A, 114B remain a fixed distance at the two ends of the tubular body 112. As the two magnet balls 114A, 114B attract the iron powder in the transparent plate 124 on the outer side of the box wall 100 through the magnetic force, one magnetic sensing pattern of the iron powder is presented for each of the upper and lower regions 124B, 124A of the transparent plate 124.

In the left part of FIG. 2, when the sensing module 110 leaves the frozen environment and the temperature rises, the eutectic material for low temperature energy storage 116 in the tubular body gradually thaws into a liquid and the magnet ball 114B falls freely down to the bottom side of the chamber of the tubular body by gravity. Assuming the fixed distance maintained by the magnet balls 114A, 114B being the first distance and the distance between the fallen magnet ball 114B and the magnet ball 114A being the second distance, due to thawing, the distance between the magnet balls 114A, 114B is shortened (i.e. the second distance is less than the first distance). As shown on the left of FIG. 2, the two magnet balls 114A, 114B attract the iron powder in the transparent plate 124 on the outer side of the box wall, but this time only the lower region 124A of the transparent plate 124 displays two magnetic sensing patterns of the iron powder. It is easy to determine whether the temperature at the opposite side of box wall 100 has exceeded a predetermined limit from the final location of the magnetic sensing pattern(s) of the iron powder in the particular region. That is, in this embodiment, the temperature change can be observed from the change(s) in the location of the magnetic sensing pattern(s) (e.g. either the two magnetic sensing patterns are located in one single region or in two regions, or distance changes between both magnetic sensing patterns).

The detached-type temperature indicator 10 utilizes the mechanism of gravity as well as magnetic force, and it can be used repeatedly for multiple times, as long as the eutectic material for low temperature energy storage 116 in the temperature sensing module 110 is frozen into a solid before re-use. When two magnetic sensing patterns appear in the upper and lower regions, or keep a certain distance, it means that the temperature is lower than the freezing point. If both magnetic sensing patterns appear in the same region or to be too close, it means that the eutectic material for low temperature energy storage has thawed into a liquid in the tube, and the temperature has exceeded the freeze point. This embodiment clearly describes the temperature changes sensed by the temperature sensing module can be conveyed through the changes in the magnetic sensing patterns of the temperature display module.

Figure 3:
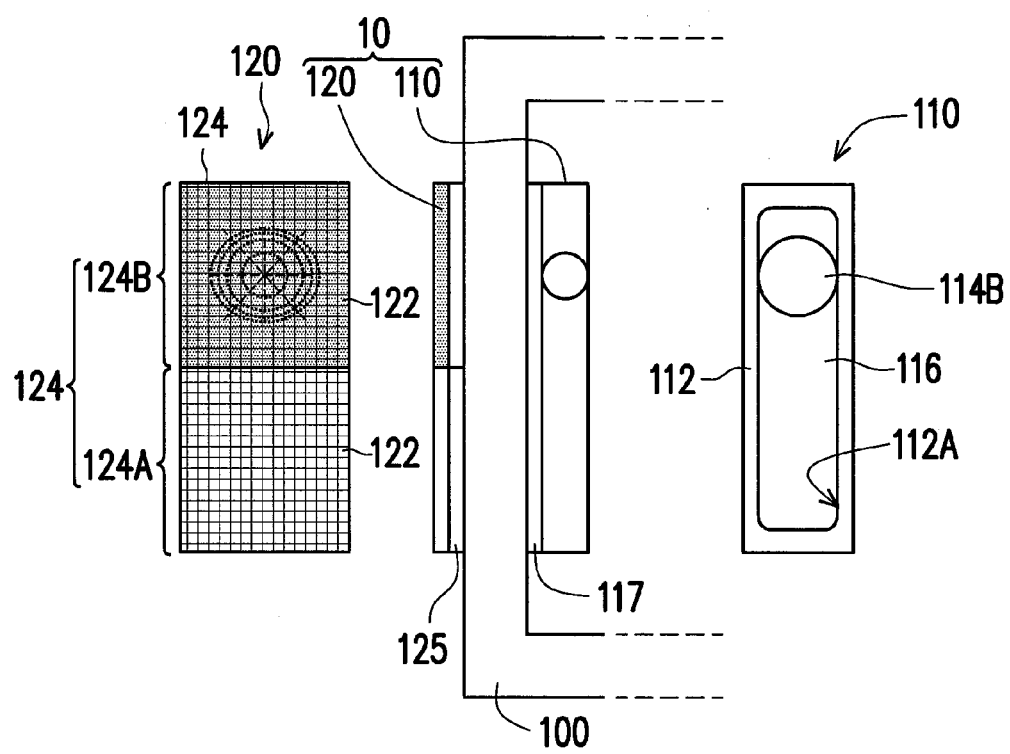
FIG. 3 is a schematic view of a detached-type temperature indicator structure according to the second embodiment of the disclosure.

According to the second embodiment of this disclosure, if the position alignment of the temperature sensing module 110 and the temperature display module 120 can be well-controlled, that is, accurate alignment of the positions of both modules when attached to two opposite sides of the box wall can be achieved, the lower reference magnet ball (i.e. the fixed and immobile magnet ball) used in the first embodiment may not be required. As shown in FIG. 3, the temperature sensing module 110 and the temperature display module 120 lack of the lower positioning reference parts of FIG. 1, by taking off the fixed magnet ball 114A in the temperature sensing module 110 and a region of the lower region 124A of the display module 120 corresponding to the magnet ball 114A (FIG. 1), which further minimizing the size of the detached-type temperature indicator and reducing the production costs of the detached-type temperature indicator.

Measurement of Multiple Temperature Ranges

Figure 4A:
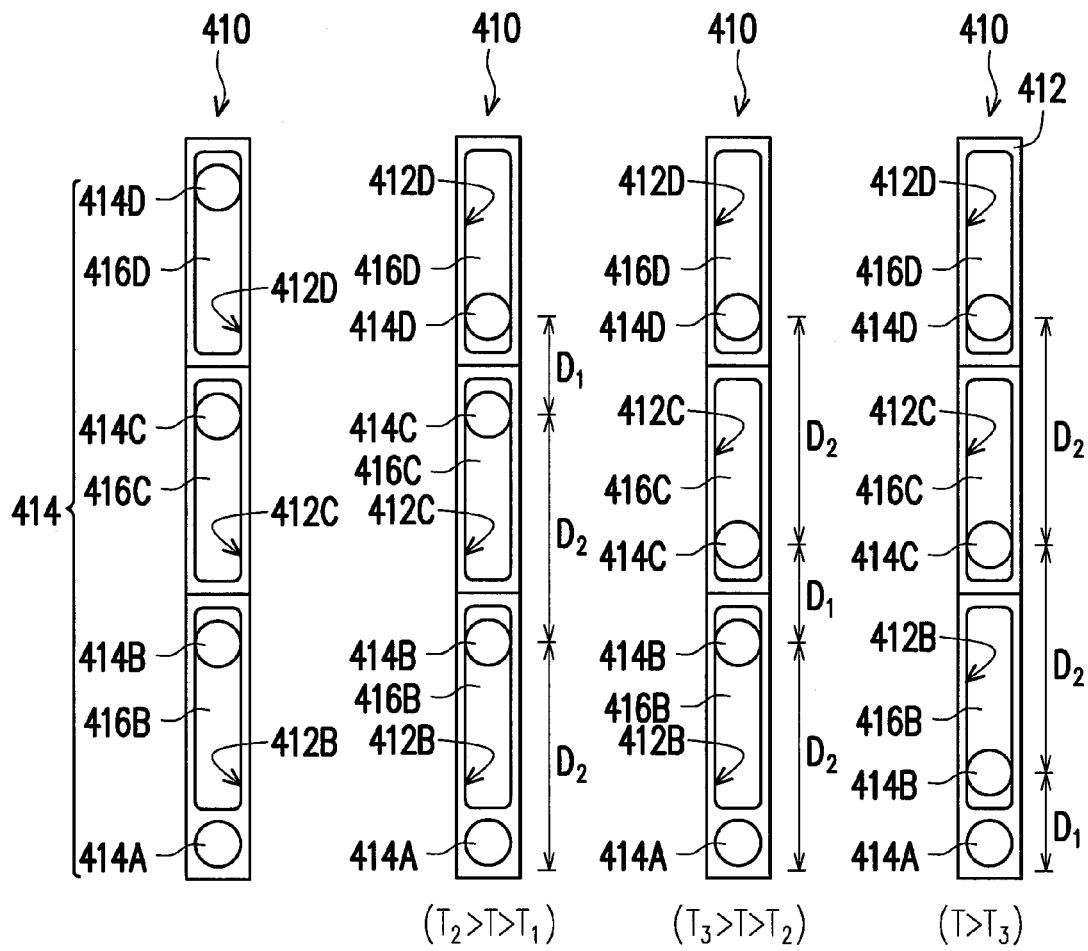
FIGS. 4A-4C are schematic views of detached-type temperature indicator structures according to the embodiments of the disclosure.

FIG. 4A is a schematic display of a detached-type temperature indicator 410 according to the third embodiment of the disclosure. Referring to FIG. 4A, the temperature sensing module 410 may be composed of a plurality of chambers, and the chambers of the tubular body 412 have different types of eutectic materials for low temperature energy storage with different freezing points. As shown in FIG. 4A, the temperature sensing module 410 comprises a tubular body 412 containing three chambers 412B, 412C, 412D with a plurality of magnet balls 414 therein. The magnet balls 414 includes a magnet ball 414A secured at the bottom of the tubular body 412 and three magnet balls 414B, 414C, 414D located respectively in the three chambers 412B, 412C, 412D. Three chamber 412B, 412C, 412D are arranged respectively at the lower layer, middle layer and upper layer of the tubular body 412. Three chambers 412B, 412C, 412D (as the third chamber, the second chamber, the first chamber) are respectively filled with different eutectic materials for low temperature energy storage 416B, 416C, 416D, and the eutectic materials for low temperature energy storage 416B, 416C, 416D have three different freezing temperatures. The eutectic material for low temperature energy storage 416D of the lowest freezing temperature T1 is filled in the chamber 412D at the top, the eutectic material for low temperature energy storage 416C of the second lowest freezing temperature T2 is filled in the middle chamber 412C, and the eutectic material for low temperature energy storage 416B of the highest freezing temperature T3 is filled in the chamber 412B at the bottom. For example, the freezing temperatures from top to bottom, T1, T2, T3, are respectively −18° C., −8° C. and 8° C. During application, as described in the foregoing embodiments, the entire module is frozen upside down so that the magnet balls 414B, 414C, 414D (as the fourth magnet ball, the third magnet ball, the second magnet ball) are in the farthest distance to the magnet ball 414A outside the chambers. When the ambient temperature T of the temperature sensing module 410 is higher than the lowest freezing point temperature T1 of the eutectic material for low temperature energy storage 416D, the topmost magnet ball 414D is fallen, which is the third state from the right of FIG. 4A (T2>T>T1). If the temperature T is higher than the freezing point temperature T2 of the eutectic material for low temperature energy storage 416C, both magnet balls 414D, 414C are fallen, which is the second state from the right of FIG. 4A (T3>T>T2). If the temperature T is higher than the highest freezing temperature T3 of the eutectic material for low temperature energy storage 416B, three magnet balls are fallen and it turns into the first state at the right (T>T3). Through changes in the positions of the magnet balls in different layers and changes in the distance between the magnet balls, the temperature display module can present corresponding changes in the magnetic sensing patterns (the distance changes between the magnetic sensing patterns), so as to show the temperature range inside the packaging easily.

Figure 4B:
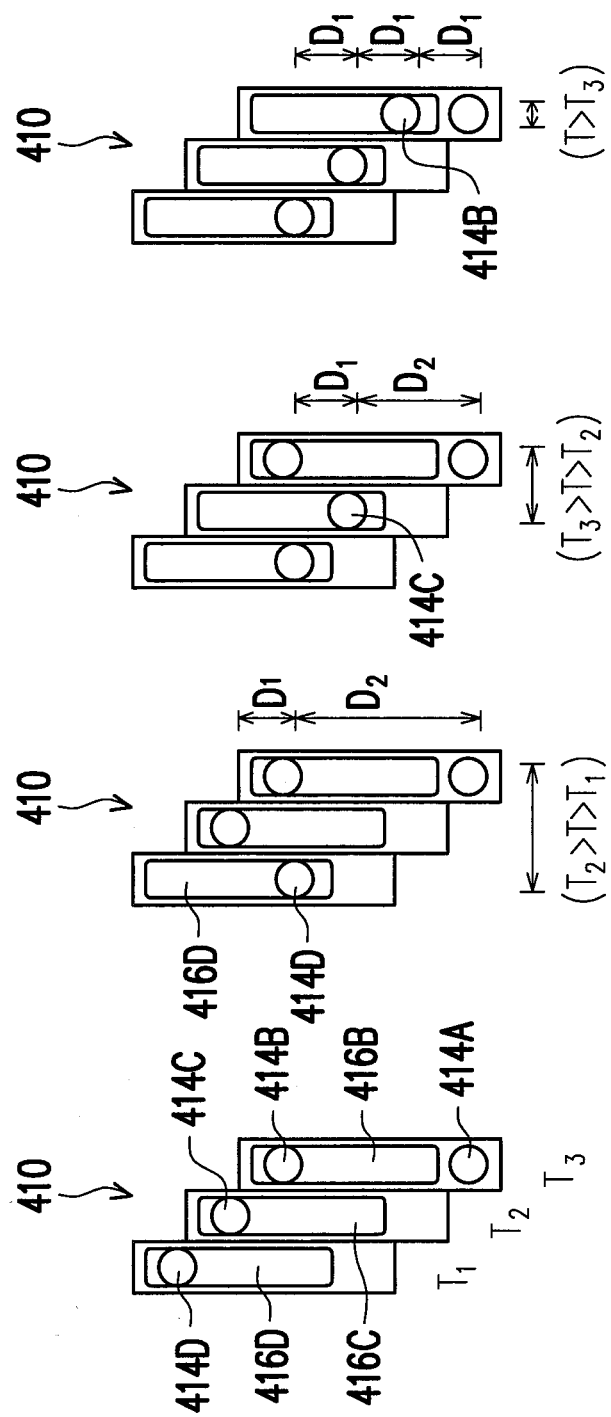
Figure 4C:
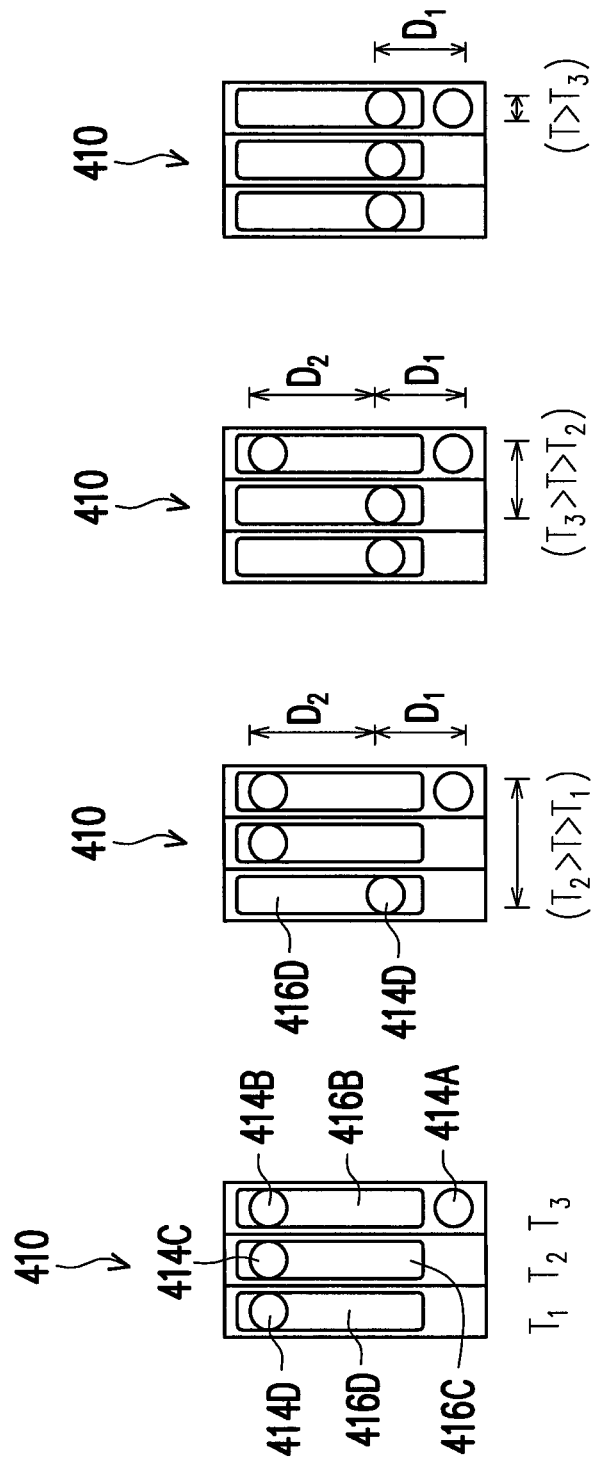

Compared to FIG. 4A, FIGS. 4B and 4C are also designed to observe multiple temperature ranges, with different arrangement of the chambers filled with different eutectic materials for low temperature energy storage. These designs can be changed or adjusted based on product demands or the convenience of visual observation. In FIG. 4B, three chambers 412B, 412C, 412D are arranged at the right and lower part, the middle part and the left and upper part, slantingly at an angle of 45 degrees. In FIG. 4C, three chambers 412B, 412C, 412D are respectively aligned in parallel and arranged as the right, the middle and the left parts.

The arrangement of the chambers in above third embodiment is arranged in a slant way at an angle of 45 degrees. However, any angle from 45 degrees to 90 degrees may be employed in this disclosure.

For easy identification of the changes in the temperature sensed by the temperature sensing module, the type, shape and/or size of the magnet ball(s) can be modified so that the temperature display module displays different shapes and/or sizes of the magnetic sensing pattern(s) correspondingly.

For the single temperature layer, if the farthest and nearest distances of the magnet balls are not predetermined, plural pieces or different types of magnet balls can be installed outside the tubular body for distinction and positioning reference purposes.

Since the detached-type temperature indicator requires no electricity and the sensed temperature changes can be conveyed to the separate temperature display module. The detached-type temperature indicator of this disclosure is suitable to be used to observe the temperature changes of the items in the box (such as cold box, insulated cold storage box, insulated plastic container, carton, crate, bag, etc), and to directly inform the internal temperature from the outside of the packaging without opening the packaging.

Meanwhile, the detached-type temperature indicator of this disclosure is low in costs, devoid of using electricity, reusable repeatedly and at lower costs of manual operation, especially suitable for applications in warehousing & storage and logistics industry.

This disclosure has been described above in several embodiments, but is not limited to those. It is known to persons skilled in the art that some modifications and innovations may be made without departing from the spirit and scope of this disclosure. Hence, the scope of this disclosure should be defined by the following claims.

What is claimed is:

1. A detached-type temperature indicator attached to a box wall, the detached-type temperature indicator comprising:
a temperature sensing module, wherein the temperature sensing module includes a tubular body having at least one chamber and a plurality of magnet balls, and the at least one chamber of the tubular body is filled with a eutectic material for low temperature energy storage, the plurality of magnet balls include a first magnet ball secured at the bottom of the tubular body and a second magnet ball in the at least one chamber, the second magnet ball is immersed in the eutectic material for low temperature energy storage filled in the at least one chamber;

a temperature sensing module adhesive layer, wherein the temperature sensing module is attached to an inner side of the box wall via the temperature sensing module adhesive layer;

a temperature display module, wherein the temperature display module includes a transparent plate internally separated into a plurality of cells and magnetic sensing substances uniformly dispersed within the plurality of cells, and the magnetic sensing substances have magnetic attraction with the first magnet ball and the second magnet ball to respectively show a first magnetic sensing pattern and a second magnetic sensing pattern; and a temperature display module adhesive layer, wherein the temperature display module is attached to an outer side of the box wall via the temperature display module adhesive layer, wherein the temperature sensing module and the temperature display module are attached to the inner side and the outer side of the box wall respectively, and positions of the temperature sensing module and the temperature display module on the inner side and the outer side of the box wall aligned with each other, so that a temperature change sensed by the temperature sensing module is displayed in the temperature display module through a pattern change of the first and second magnetic sensing patterns via magnetic attraction of the plurality of magnet balls.

2. The detached-type temperature indicator of claim 1, wherein the tubular body of the temperature sensing module includes at least two or more chambers, filled with different types of eutectic materials for low temperature energy storage.

3. The detached-type temperature indicator of claim 2, wherein the tubular body of the temperature sensing module includes a first chamber, a second chamber and a third chamber, respectively filled with a first eutectic material for low temperature energy storage, a second eutectic material for low temperature energy storage and a third eutectic material for low temperature energy storage, the first eutectic material for low temperature energy storage, the second eutectic material for low temperature energy storage and the third eutectic material for low temperature energy storage have respectively a first freezing temperature, a second freezing temperature and a third freezing temperature, and the first freezing temperature is lower than the second freezing temperature, and the second freezing temperature is lower than the third freezing temperature.

4. The detached-type temperature indicator of claim 3, wherein the first chamber, the second chamber and the third chamber are respectively arranged as a top layer, a middle layer and a bottom layer of the tubular body.

5. The detached-type temperature indicator of claim 3, wherein the first chamber, the second chamber and the third chamber are respectively arranged as a left part, a middle part and a right part of the tubular body.

6. The detached-type temperature indicator of claim 3, wherein the first chamber, the second chamber and the third chamber are arranged in a slant way at an angle selected from 45 degrees to 90 degrees.

7. The detached-type temperature indicator of claim 3, wherein the first chamber, the second chamber and the third chamber include respectively a second magnet ball, a third magnet ball and a fourth magnet ball immersed in the first eutectic material for low temperature energy storage, the second eutectic material for low temperature energy storage and the third eutectic material for low temperature energy storage respectively.

8. The detached-type temperature indicator of claim 1, wherein the magnetic sensing substances includes iron powder or magnet balls with two dipoles in different colors.

9. A method of using a detached-type temperature indicator, the temperature indicator comprises a temperature sensing module and a temperature display module, the method comprising:

freezing the temperature sensing module of the temperature indicator upside down, wherein the temperature sensing module includes a tubular body having at least one chamber and a plurality of magnet balls, and the at least one chamber of the tubular body is filled with a eutectic material for low temperature energy storage, the plurality of magnet balls includes a first magnet ball secured at the bottom of the tubular body and a second magnet ball contained in the at least one chamber, a second magnet ball is frozen and fixed in the eutectic material for low temperature energy storage;

inverting the temperature sensing module after completion of freezing the temperature sensing module;

attaching the temperature sensing module to an inner side of a wall of a box, and attaching the temperature display module to an outer side of the box wall, wherein the temperature display module includes magnetic sensing substances, and the magnetic sensing substances have magnetic attraction with the first magnet ball and the second magnet ball to respectively show a first magnetic sensing pattern and a second magnetic sensing pattern;

sensing a temperature of an item within the box, wherein when the temperature of the item is lower than or equal to a freezing temperature of the eutectic material for low temperature energy storage, the second magnet ball remains stationary and when the temperature of the item is higher than the freezing temperature, the second magnet ball shifts; and reading the first magnetic sensing pattern and the second magnetic sensing pattern of the temperature display module directly from outside of the box wall, wherein a temperature change sensed by the temperature sensing module is displayed in the temperature display module through a pattern change of the first and second magnetic sensing patterns.

10. The method of claim 9, wherein during freezing, a freezing temperature is lower than the freezing temperature of the eutectic material for low temperature energy storage, the eutectic material for low temperature energy storage is frozen into a solid inside the at least one chamber, so that the second magnet ball is fixed in the at least one chamber and there is a first distance between the first and second magnet balls.

11. The method of claim 10, wherein during sensing the temperature of the item, when the temperature of the item is lower than or equal to the freezing temperature, the eutectic material for low temperature energy storage remain solid and the first distance is maintained between the first magnet ball and the second magnet ball, and when the temperature of the item is higher than the freezing temperature, the eutectic material for low temperature energy storage turns into a liquid and the second magnet ball shifts, so that there is a second distance between the first and the second magnet balls, and the second distance is shorter than the first distance.

12. The method of claim 10, wherein the temperature change of the temperature sensing module is displayed by a distance change of the first magnetic sensing pattern and the second magnetic sensing pattern through a change in positions of the plurality of magnet balls.

13. A detached-type temperature indicator attached to a box wall, the detached-type temperature indicator comprising:
   a temperature sensing module, wherein the temperature sensing module includes a tubular body having at least one chamber and at least one magnet ball, and the at least one chamber of the tubular body is filled with a eutectic material for low temperature energy storage, the at least one magnet ball is immersed in the eutectic material for low temperature energy storage filled in the at least one chamber;
   a temperature sensing module adhesive layer, wherein the temperature sensing module is attached to an inner side of the box wall via the temperature sensing module adhesive layer;
   a temperature display module, wherein the temperature display module includes a transparent plate separated into at least two regions and magnetic sensing substances uniformly dispersed within the cells of the at least two regions, and the magnetic sensing substances have magnetic attraction with the at least one magnet ball to show a magnetic sensing pattern; and
   a temperature display module adhesive layer, wherein the temperature display module is attached to an outer side of the box wall via the temperature display module adhesive layer,
   wherein the temperature sensing module and the temperature display module are attached to the inner side and the outer side of the box wall respectively, and positions of the temperature sensing module and the temperature display module on the inner side and the outer side of the box wall aligned with each other, so that a temperature change sensed by the temperature sensing module is displayed in the temperature display module through the magnetic sensing pattern via magnetic attraction of the at least one magnet ball.

14. The detached-type temperature indicator of claim 13, wherein the magnetic sensing substances includes iron powder or magnet balls with two dipoles in different colors.

15. A method of using a detached-type temperature indicator, the temperature indicator comprises a temperature sensing module and a temperature display module, the method comprising:
   freezing the temperature sensing module of the temperature indicator upside down, wherein the temperature sensing module includes a tubular body having at least one chamber and at least one magnet ball, and the at least one chamber of the tubular body is filled with a eutectic material for low temperature energy storage, the at least one magnet ball is frozen and fixed in the eutectic material for low temperature energy storage;
   inverting the temperature sensing module after completion of freezing the temperature sensing module;
   attaching the temperature sensing module to an inner side of a wall of a box, and attaching the temperature display module to an outer side of the box wall, wherein the temperature display module includes magnetic sensing substances, and the magnetic sensing substances have magnetic attraction with the at least one magnet ball to show a magnetic sensing pattern;
   sensing a temperature of an item within the box, wherein when the temperature of the item is lower than or equal to a freezing temperature of the eutectic material for low temperature energy storage, the at least one magnet ball remains stationary and when the temperature of the item is higher than the freezing temperature, the at least one magnet ball shifts; and
   reading the magnetic sensing pattern of the temperature display module directly from outside of the box wall,
   wherein a temperature change sensed by the temperature sensing module is displayed in the temperature display module through a pattern change of the magnetic sensing pattern.

16. The method of claim 15, wherein the temperature change of the temperature sensing module is displayed by a position change of the magnetic sensing pattern through a position change of the at least one magnet ball.

* * * * *